United States Patent [19]

Kuppenheimer, Jr. et al.

[11] Patent Number: 5,000,566
[45] Date of Patent: Mar. 19, 1991

[54] OPTICAL VELOCIMETER

[75] Inventors: John D. Kuppenheimer, Jr., Tewksbury, Mass.; Patrick E. Perkins, Sunnyvale, Calif.

[73] Assignee: Lockheed Sanders, Inc., Nashua, N.H.

[21] Appl. No.: 461,348

[22] Filed: Jan. 5, 1990

[51] Int. Cl.$^5$ .............................................. G01P 3/36
[52] U.S. Cl. ..................................... 356/28; 356/152; 340/974; 340/978
[58] Field of Search ..................... 356/28, 28.5, 152; 340/974, 978

[56] References Cited

U.S. PATENT DOCUMENTS

| | | | |
|---|---|---|---|
| 4,227,261 | 10/1980 | Robertsson | 89/41.06 |
| 4,483,614 | 11/1984 | Rogers | 356/28.5 |
| 4,506,979 | 3/1985 | Rogers | 356/28.5 |
| 4,516,851 | 5/1985 | Parker et al. | 356/28 |
| 4,766,323 | 8/1988 | Franklin et al. | 356/28 |
| 4,859,055 | 8/1989 | Gal et al. | 356/28 |

Primary Examiner—Stephen C. Buczinski
Attorney, Agent, or Firm—Robert G. Crooks

[57] ABSTRACT

This optical velocimeter may be installed in an aircraft to measure the true airspeed and the angles of attack and of sideslip of the aircraft. Alternatively, the velocimeter may be mounted in a wind tunnel to measure the velocity of the airstream passing through the wind tunnel. In either case, the points of reference for measurement are the large number of aerosol particles that are entrained in the air and are assumed to have the same velocity as the oxygen and nitrogen molecules of the air itself.

The velocimeter comprises a plurality of optical transmitters and optical receivers. Each transmitter includes a laser operated in the continuous-wave mode and a laser operated in the pulsed mode. The laser operated in the continuous-wave mode generates a "precursor light sheet" at some distance from the aircraft whose velocity is to be measured or in the wind-tunnel airstream whose velocity is to be measured. When an aerosol particle intercepts the precursor light sheet, the laser operating in the pulsed mode, after a suitable time delay, generates a "first successor light sheet," which is in turn intercepted by the aerosol particle. The time of such interception is registered and initiates a delay period for passage of the aerosol particle to intercept "a second successor light sheet", also generated by the laser operated in the pulsed mode.

The interception by the aerosol particle of the precursor light sheet and then in turn the two successor light sheets causes scintillations which propagate light back to the aforementioned receivers in the velocimeter. The receivers and their associated electronic circuitry record the time of passage of the aerosol particle between the two successor light sheets, as a first measure of the velocity of the aircraft with respect to the particles, or of the particles with respect to some fixed benchmark.

By having a plurality of transmitters forming pairs of light sheets, such pairs being neither parallel nor orthogonal to one another, it is possible to resolve the components of motion of the respective aerosol particles and to recombine the resolved components to compute the vector components of the true velocity of the aircraft with respect to its own coordinate system. Certain other computations enable determination of the angle of attack and the angle of sideslip, if any, of the aircraft. Still further, this velocimeter calculates the Mach rate of the aircraft. These calculated outputs are then used as inputs to the control system for the aircraft, which may be inherently unstable and completely dependent upon such control inputs.

8 Claims, 5 Drawing Sheets

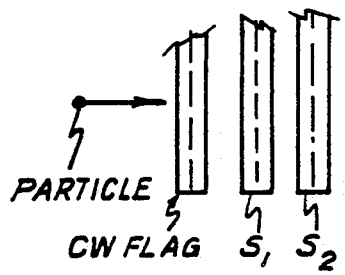
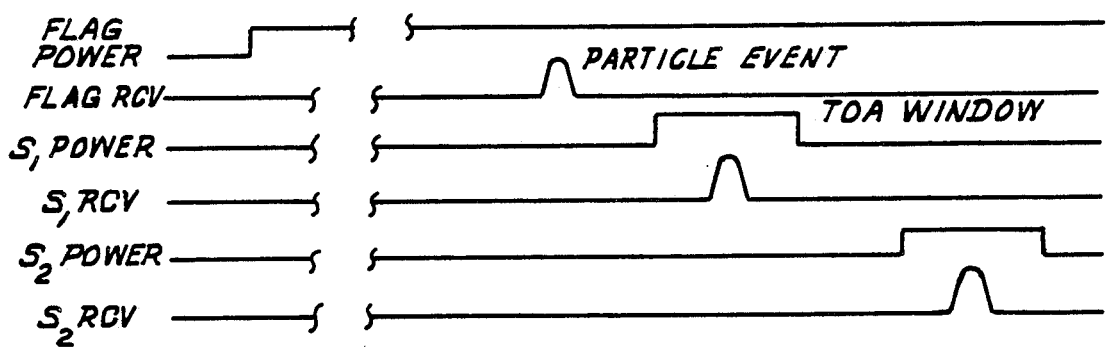
FIG. 2
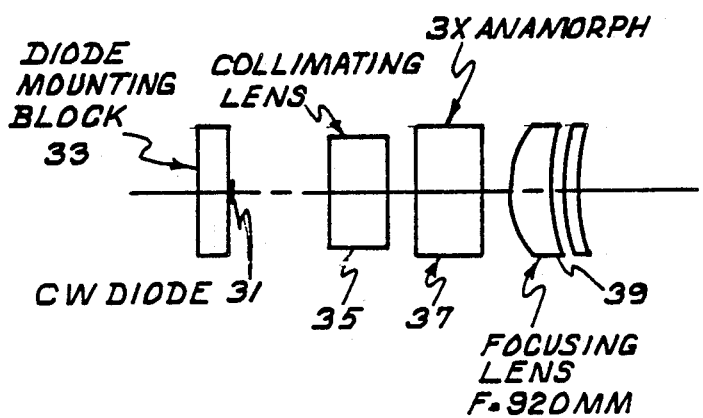
FIG. 3

OPTICAL VELOCIMETER

This invention relates to an optical velocimeter for measuring relative velocity between a mobile platform and certain aerosol particles in a gas surrounding said platform. The velocimeter is of particular utility when the aforementioned mobile platform is an aircraft, and when it is necessary to measure continuously the true air speed, angle of attack, and angle of sideslip of the aircraft. In order to be of maximum possible utility, the velocimeter must be capable of measuring the true air speed and attitude of the aircraft at all altitudes where the aircraft might conceivably fly and, further, must deliver the information relating to true air speed and attitude at a very high data rate.

BACKGROUND OF THE INVENTION

For many years, designers of aircraft have recognized the necessity of providing a continuous reading of the air speed of the aircraft during its operation. There have been a number of different approaches to the measurement of air speed and of the other performance data that are relevant to the operation of the aircraft. The traditional approach to the measurement of air speed was the so-called "pitot-static tube", which is a device usually mounted on the wing of the aircraft and which samples and compares the dynamic and static pressures of the air at the location of the pitot-static tube. With the advent of high- performance aircraft, the pitot-static tube was no longer satisfactory as a device for measuring true air speed. Moreover, it was not capable of accumulating data useful in evaluating other quantities such as the angle of attack and the angle of sideslip (when these parameters become large) of the aircraft.

Especially after the advent of supersonic aircraft, which generate a shock wave that surrounds the aircraft in its flight, it became necessary to take a totally new approach to measuring the motion of the aircraft with respect to the air in which it is flying.

One modern approach depends upon the use of the laser as a source of optical radiation which may be directed from an aircraft into the surrounding air and which may be scattered by tiny aerosol particles having a typical size of a few micrometers or less. Another approach has been to direct a beam of optical radiation from a laser into the atmosphere in an attempt to excite the molecules of oxygen and nitrogen in the atmosphere to cause them to fluoresce, giving off light which could then be detected aboard the aircraft and which would give certain information concerning the relative motion between the aircraft and those oxygen and nitrogen molecules. A disclosure of this nature appears in U.S. Pat. No. 4,483,614, issued on Nov. 20, 1984 to Philip L. Rogers, and entitled "Optical Air Data Measurement System". In that reference, light which is backscattered from aerosol particles in the air is compared with fluorescent light radiation given off by molecular particles as a result of excitation by the light flux from the laser aboard the aircraft. Comparison of the two types of light produces a fringe pattern which is meaningful in velocimetry. The aforementioned data-measurement system would, in practice, be very complicated.

One particular factor which has emphasized the need for a new type of velocimeter has been the development of high-performance aircraft characterized by negative stability. Such inherently unstable aircraft must be controlled continuously at all times during their flight, or they will go completely out of control and crash. The requirement for complete and continuous control has been made even more difficult to satisfy because fighter aircraft must be fully aerobatic in order to carry out the violent maneuvers of aerial combat. In order to satisfy that requirement, a data rate of about 60 Hertz is regarded as necessary. The problem of providing a sufficient data rate is exacerbated at high altitudes where the density of particles suitable for backscattering optical radiation is much less than at low altitudes. Still further, the problem becomes extremely difficult when the aircraft is flying near its stall speed or when it is moving with large components of sidewise or vertical motion, commonly referred to as "sideslip" or "angle of attack" respectively. It has not been possible to overcome these difficulties by means of prior-art techniques typified by the aforementioned Rogers patent, which probably represents the most advanced prior art up to the time of our invention.

OBJECTS OF THE INVENTION

In view of the deficiencies of prior-art methods of measuring air speed or relative velocity with sufficient accuracy under varying conditions of aircraft attitude and at all altitudes and flight conditions, it is an object of our invention to provide a new apparatus and technique for measuring true air speed, angle of attack, and angle of sideslip under all atmospheric conditions, and at all altitudes and air speeds and attitudes of the aircraft in which the apparatus is mounted.

It is another object of our invention to provide an apparatus which is capable of selecting aerosol particles in the atmosphere which are suitable for use as reference points in the measurement of relative velocity. The apparatus must likewise be capable of rejecting from consideration all particles which are not suitable for use as reference points.

It is a further object of our invention to provide a velocimeter capable of measuring relative velocity between an aircraft and certain aerosol particles which are far enough from the aircraft to be relatively undisturbed in their position or velocity by the presence of the aircraft. On the other hand, the aerosol particles must be near enough to the aircraft that the angular measurements on the beam of light employed in the velocimeter may be made with acceptable accuracy.

It is a still further object of our invention to provide a velocimeter which is relatively compact and durable and which can be mounted in the aircraft whose true air speed is to be measured and be able to withstand the severe environmental conditions imposed by that aircraft.

Finally, it is still another object of our invention to provide a velocimeter which may be manufactured at reasonable cost for use in aircraft or for use in wind tunnels or other applications where relative velocity must be measured, regardless of whether the velocimeter or the particles or both are in motion.

SUMMARY OF THE INVENTION

Briefly, we have fulfilled the above-mentioned and other objects of our invention by providing in the aircraft a laser beam of continuous optical radiation which is directed outwardly from the aircraft and which is formed into a "precursor sheet" of light in the vicinity of certain aerosol particles outside the aircraft. We also provide detector means mounted in the aircraft for detecting backscattered radiation resulting from the interception of the precursor sheet of light by an aerosol particle. We further provide a first source of pulsed optical radiation, mounted in the aircraft, which becomes activated upon detection of the backscattered radiation from the interception of the precursor sheet of light by the aforementioned aerosol particle. We then provide means for directing the pulsed radiation from said first source outwardly from the aircraft, and forming it into a "first successor sheet" of light in close proximity to the location where the interception of the precursor sheet of light by the aerosol particle took place. Still further, we provide a second source of pulsed optical radiation and means for directing a beam of coherent radiation outwardly from the aircraft and forming a "second successor sheet" of light near the relative position that had been occupied by the first successor sheet of light, so as to intercept the particle which had previously intercepted the first successor sheet of light. Next, we provide means for timing the formation of the second successor sheet of light with reference to the time of interception of the first successor sheet of light by the particle and we provide means for measuring the time interval between the respective interceptions of the first and second successor sheets of light by said particle. Recognizing that the passage of the aforementioned particle through the respective sheets of light will not usually be perpendicular to those sheets of light, we provide for the formation of a plurality of additional pairs of sheets of light through which the particle will also pass, and which are disposed in a fashion neither parallel nor othogonal to the first-mentioned pair of sheets of light. Appropriate means are provided for detecting the passage of the particle through those additional pairs of sheets of light, and for timing their formation and for measuring the time interval required by the particle to intercept the sheets of light of each of the plurality of additional pairs.

Finally, we provide means for measuring the time/distance intervals required by the particle to pass through the sheets of each pair and means for resolving each time/distance interval into components respectively parallel and perpendicular to the sheets of each pair. Taking account of the relative positions and orientations of the respective pairs of sheets of light, we then combine the aforementioned components of time/distance intervals to calculate the true air speed of the aircraft and its angles of attack and sideslip respectively.

BRIEF DESCRIPTION OF THE DRAWINGS

The invention summarized above will be described in detail in the following specification. The specification will be best understood if read while referring to the accompanying drawings, in which:

FIG. 2 is a diagram showing the time relationship between the signal "announcing" the interception of the precursor sheet of light by an aerosol particle, the "gates" enabling the formation of the first successor sheet of light and then the second successor sheet of light, and the signals "announcing" the interception of those sheets of light respectively by the aerosol particle;

FIG. 3 is a schematic diagram which may represent either a laser diode operating in the continuous-wave mode to generate the precursor sheet of light, or a laser diode operating in the pulsed mode to generate either or both of the successor sheets of light;

DESCRIPTION OF PREFERRED EMBODIMENTS

Figure 1:
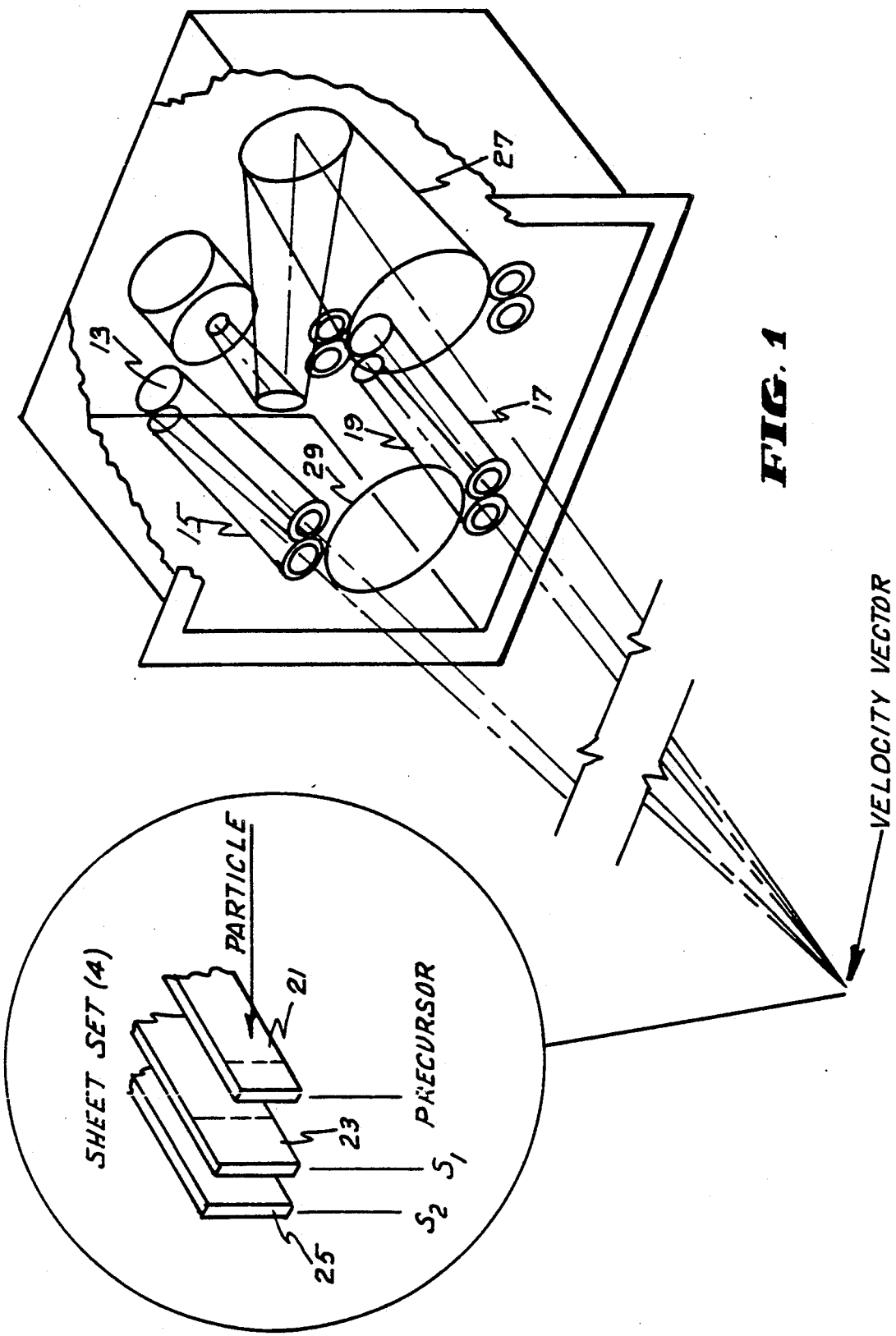
FIG. 1 is a perspective view of an optical velocimeter in accordance with our invention. Part of the case of the velocimeter has been cut away to show therewithin four pairs of transmitting optics and two receivers, respectively for forming the aforementioned sheets of light and for detecting scattered optical radiation returning to the velocimeter after encountering an aerosol particle outside the platform on which the velocimeter is mounted. Inset into FIG. 1 so as to show the particle location with respect to the velocimeter is a perspective view of the precursor sheet of light and of the first and second successor sheets of light and showing also the course of an aerosol particle in intercepting the sheets of light in the aforementioned order.

Turning to FIG. 1 of the drawings, we find a perspective view of the case in which the optical velocimeter is accommodated, together with a schematic representation of the transmitters and receivers which comprise the velocimeter. By "folding" the structure of the two receivers, it is possible to limit the size of the case to approximately 11 inches in length by 8 inches in height and 8 inches in depth. The case would typically be mounted in the sidewall of the aircraft fuselage, slightly ahead of the cockpit and with the front wall of the case flush with the skin of the fuselage. The use of the optical velocimeter in accordance with our invention avoids protrusions from the aircraft which are disadvantageous from an aerodynamic viewpoint and which are susceptible to damage. Thus, our invention overcomes two of the disadvantages of the pitot-static tube, which was aerodynamically "messy" and which was very likely to be damaged by anyone passing the wing of the aircraft on which it was mounted.

If the velocimeter case 11 is disposed in the skin of the aircraft so that it "looks" out to the side, the sheets of light may be formed a few feet away from the aircraft body, out of the boundary layer or the shock wave and in a region where the flow is relatively parallel to the free stream.

Figure 5:
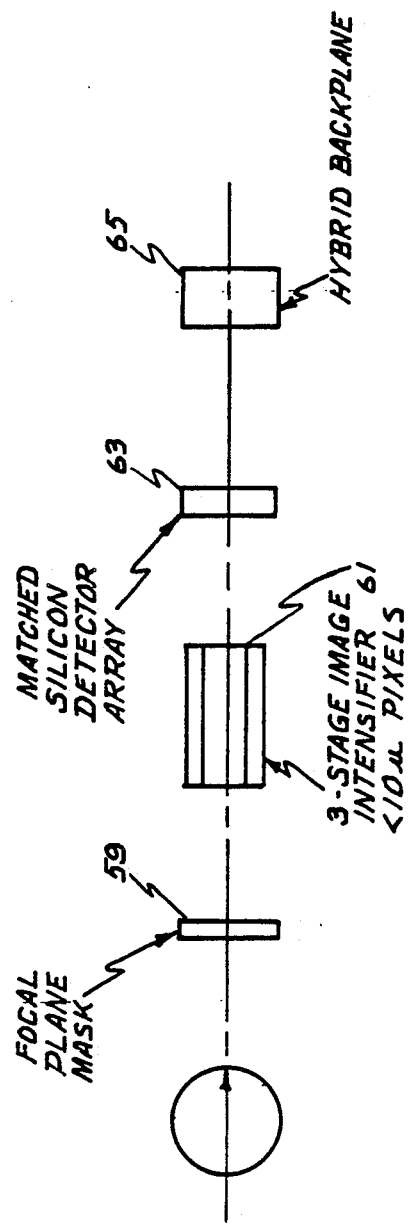
FIG. 5 is a schematic representation of a detector module which is the operative portion of each of the two receivers illustrated in FIG. 1 of the drawings. The various optical components of the detector module are illustrated schematically.

FIG. 1 shows a first tube 13 and a second tube 15 of a first transmitter including a laser source of optical radiation. FIG. 1 also shows a first tube 17 and a second tube 19 of a second transmitter having a similar purpose. Small ellipses in FIG. 1 indicate the ends of the first and second tubes of third and fourth transmitters, which have not been shown in full because of insufficient space in the drawing. First tube 13 accommodates a laser diode which is operated in the continuous-wave mode so as to generate the precursor light sheet. Second tube 15, on the other hand, accommodates a laser diode which is operated in the pulsed mode to generate the successor light sheets of a first set of light sheets. The inset portion of FIG. 1 is a perspective view of a precursor light sheet 21 and first and second successor light sheets 23 and 25 respectively. The direction of interception of the light sheets by an aerosol particle is indicated by an arrow in the inset of FIG. 1. When the particle intercepts the precursor light sheet and the first and second successor light sheets, the scintillations produced by those interceptions are sensed by means of light scattered backward from the particle to one of the two receivers 27 and 29 illustrated in FIG. 1. Once again, first receiver 27 is shown "folded" in order to save space within case 11. The optical components of first receiver 27 cause two reflections of the light received before the light reaches the sensor. By reason of lack of space, second receiver 29 is indicated only by an ellipse representing its front face. The folding of the receiver is necessary because, for any given distance between the velocimeter and the aerosol particle, there is a certain minimum optical length which must characterize the receiver in order to bring to a focus the light which is scattered back from the aerosol particle. The contents of the detector or sensor are indicated in FIG. 5 of the drawings.

The timing of the formation of the precursor and successor light sheets is illustrated in FIG. 2 of the drawings. In accordance with FIG. 2, the detector of the receiver 27 or 29 is energized by a special power supply called "flag power". When the aerosol particle intercepts precursor light sheet 21, there is a scintillation of backscattered light which is called a "particle event." The arrival of the particle event causes suitable gating circuits to open a "window" of time during which the laser is pulsed to form first successor light sheet 23. When the aerosol particle intercepts first successor light sheet 23, there is again a scintillation of backscattered light which is sensed by one of the receivers 27 or 29 and which opens another time window during which the laser is pulsed to form second successor light sheet 25. When the aerosol particle intercepts second successor light sheet 25, still another scintillation of backscattered light is sensed by one of the receivers. The time between the last-mentioned scintillations is the measure of the velocity of the aircraft relative to the aerosol particle.

The time between the first particle event, when the aerosol particle intercepts the precursor light sheet, and the opening of the time window during which the pulsed laser is in operation to form first successor light sheet 23 is established by an estimate based on the most recent prior reading of the velocimeter. That reading yields an approximate air speed for the purpose of defining the time window.

Turning to FIG. 3 of the drawings, we see a schematic representation of the laser-diode transmitter which forms the precursor light sheet. In this transmitter, the laser diode is operated in the continuous-wave mode. The laser diode 31 is mounted in a diode mounting block 33, which functions as a heat sink for the laser diode. A beam of optical radiation emitted by laser diode 31 is passed through a collimating lens 35 and an anamorphic beam expander 37. We prefer to employ an anamorphic beam expander of approximately three power to provide the proper power density and sheet width. The expanded beam of optical radiation then passes through a focusing lens 39 which defines the beam in such a way that the precursor light sheet will have the desired dimensions at the desired focal distance from the aircraft. Our preference is that focusing lens 39 should have a focal length of approximately 920 millimeters.

As noted in the explanation of FIG. 2 of the drawings, the interception of the precursor light sheet by an aerosol particle initiates, after a suitable delay, a window of time during which the pulsed-laser transmitter is energized to form the first successor light sheet. It will be understood that laser diode 31 and the continuous-wave transmitter are housed in first tube 13 as shown in FIG. 1 of the drawings, and that the pulsed laser diode 41 and its associated optical components are housed in second tube 15 as illustrated in FIG. 1.

Figure 4:
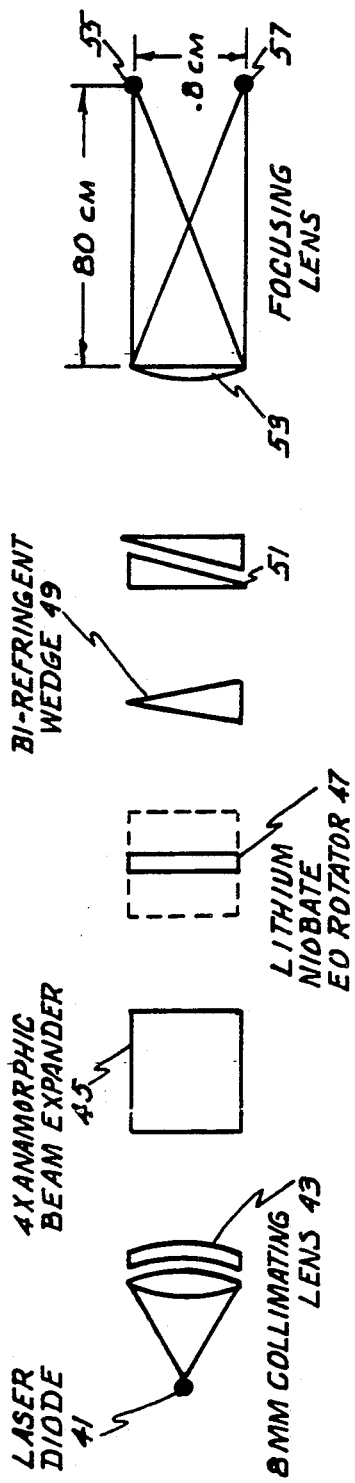
FIG. 4 is a diagrammatic representation of a laser-diode transmitter operating in the pulsed mode for generating either or both of the successor light sheets. As between the two successor light sheets, the timing and position are determined by polarization-switching means illustrated in FIG. 4.

Thus, in second tube 15 of the first transmitter and in second tube 19 of the second transmitter there may be an apparatus such as is illustrated in FIG. 4 of the drawings. In FIG. 4, we see a laser diode 41 which may be mounted on a laser-diode block that serves as a heat sink. The beam of optical radiation generated by laser diode 41 is then passed through a collimating lens 43 and an anamorphic beam expander 45 having a purpose similar to that of anamorphic beam expander 37, illustrated in FIG. 3. We prefer that collimating lens 43 should have a focal length of approximately 8 millimeters. The expanded beam of optical radiation emanating from anamorphic beam expander 45 next passes through an optical rotator 47. This is a known device which may be formed from a crystal of lithium niobate and which can alter the polarization of light passing through it. By the application of a high control voltage to rotator 47, the polarization of the optical radiation passing through it may be rotated through an angle of 45 degrees. The application of the control voltage to rotator 47 determines whether the first or second successor light sheet is formed. This is accomplished by passing through a birefringent wedge 49 the optical radiation emerging from rotator 47. The birefringent wedge is a known device which imparts a differing degree of refraction to light passing through it, depending upon the polarization of the light. Thus, depending upon the polarization of the radiation passing through birefringent wedge 49, the beam forms a first successor light sheet 55 or a second successor light sheet 57. In FIG. 4, first successor light sheet 55 and second successor light sheet 57 are shown spaced apart by approximately 0.8 centimeter. In order to control accurately the formation of the beam which is to define the light sheets, the radiation emerging from birefringent wedge 49 is first passed through Risley prisms 51 and a focusing lens 53. The timing circuitry which was mentioned during the discussion of FIG. 2 determines whether and at what times the control voltage is applied to rotator 47, thereby determining the polarization of the light and whether the sheet will be at position 55 or at position 57. We prefer to bias the control voltage of rotator 47 so that a positive control voltage is required in order to form the first successor light sheet at position 55, whereas a negative control voltage is required in order to form second successor light sheet 57 at a position approximately 0.8 centimeter displaced from the first-mentioned position. If no control voltage were applied to rotator 47, there would be equal illumination of the light sheets at positions 55 and 57.

We turn now to consideration of the operative portions of first receiver 27 and second receiver 29 as illustrated in FIG. 1 of the drawings. The detector module which is the operative portion of both receivers is illustrated in FIG. 5 of the drawings.

As shown in FIG. 5, the backscattered radiation from the scintillation caused by the interception of the light sheet by an aerosol particle is taken into first receiver 27 or second receiver 29 as the case may be. In either receiver, after the scattered light is focused at a point determined partly by the distance from the velocimeter to the reference particle, the received light passes first through a focal-plane mask 59 and then enters an image intensifier 61. For this purpose, we prefer to employ a three-stage microchannel plate image intensifier. The output of image intensifier 61 then goes to a silicon detector array 63 which converts the intensified light energy into an electrical signal. Finally, the electrical signal is fed to a hybrid backplane 65 which comprises a number of components as follows:

a. Transimpedance amplifiers;
b. Leading-edge discriminators; and
c. Trailing-edge discriminators.

The aforementioned discriminators serve the purpose of distinguishing between aerosol particles which are suitable for measurement purposes and aerosol particles which, by reason of size or density, are not suitable for measurement purposes. Image intensifier 61 includes a photocathode which should be as efficient as possible. We prefer to employ a photocathode marketed by Varian Associates of Palo Alto, Calif., having a quantum efficiency of approximately 50%.

Figure 6:
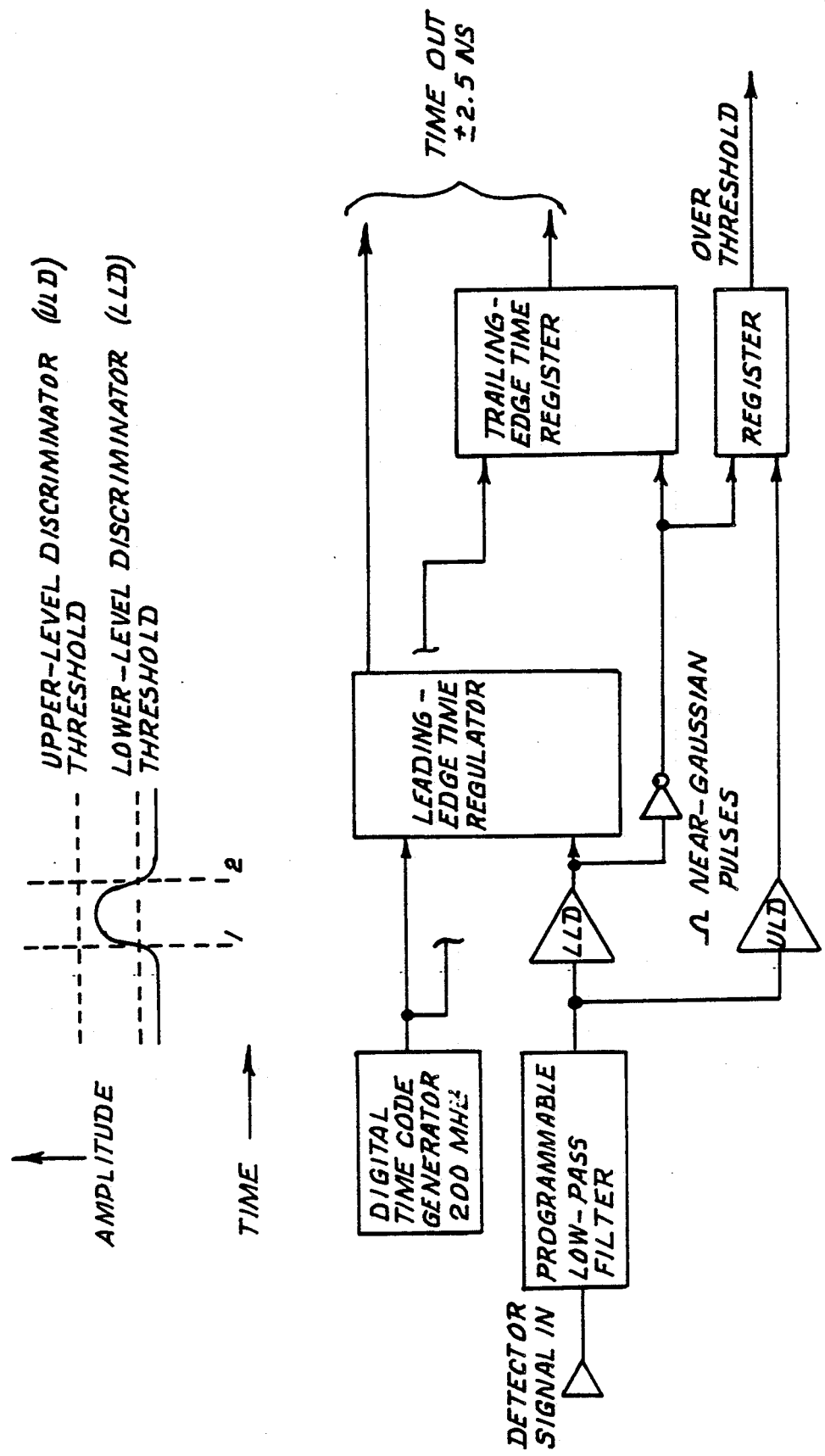
FIG. 6 is a block diagram of a discriminator circuit which distinguishes between signals caused by the interception of the light sheets by "acceptable" aerosol particles and interception of the light sheets by aerosol particles which for one reason or another are "unacceptable" for use in velocity measurement.
Figure 7:
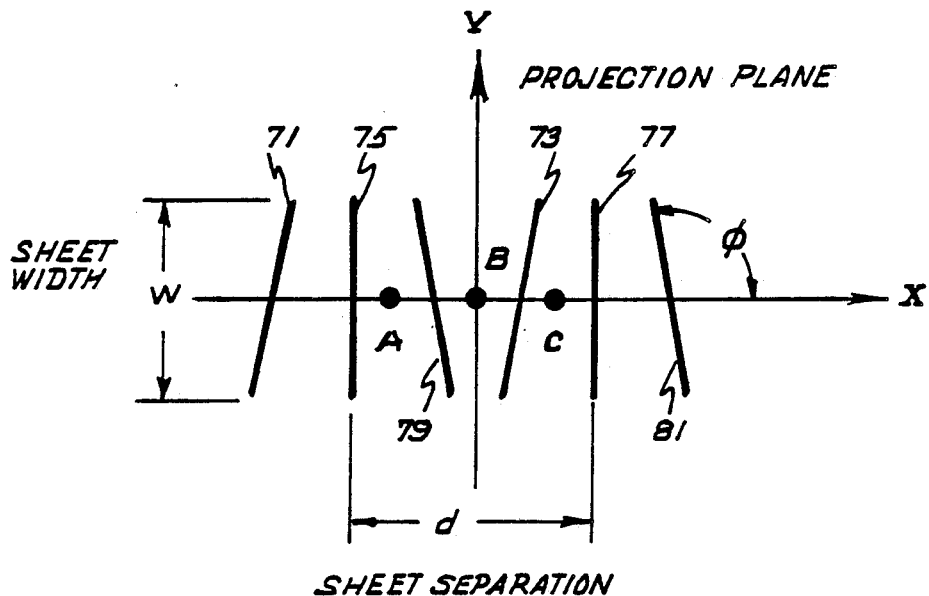
FIG. 7 is a diagram of the non-orthogonal disposition of three light-sheet pairs, the two sheets of each pair nevertheless being parallel to each other, while interleaved with sheets of the other two pairs.
Figure 8:
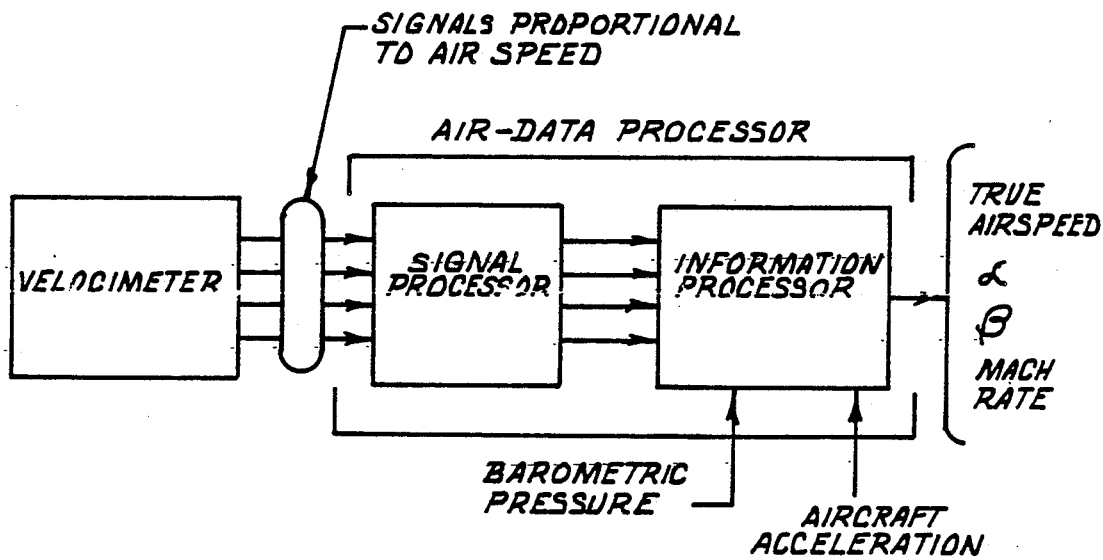
FIG. 8 is a block diagram of the logic circuits for taking the output information relating to air speed from the velocimeter and combining that information with other information to give a final readout including true air speed, angle of attack ("Alpha"), angle of sideslip ("Beta"), and Mach rate.

The control of rotator 47 and of the pulsed lasers of the various transmitters is performed by means of circuitry which is illustrated in block-diagram form in FIG. 6 of the drawings. The functions of the circuitry schematically illustrated in FIG. 6 can be divided into three principal groups as follows:

1. The signals from the detector modules of both receivers 27 and 29 are separated according to amplitude so that the velocity measurements may be based only upon scintillations caused by interceptions of the light sheets by aerosol particles of suitable size and density;

2. The circuitry of FIG. 6 also digitizes the time of the leading and trailing edges of each pulse illustrated in FIG. 2 of the drawing so that the center time of each time window can be properly estimated; and 3. The measurement data satisfying the criteria imposed by the upper-level discriminator and the lower-level discriminator are assembled and transmitted over a data bus to an information processor which separates the transit times into components normal and parallel to the light sheets of the three distinct light-sheet pairs.

The upper-level discriminator and lower-level discriminator, whose functions are illustrated in FIG. 6, together comprise a sort of band-pass filter for size of aerosol particles. The levels at which these discriminators are set are programmed by the aforementioned information processor. Aerosol particles which are large enough to produce sensor-output pulses that exceed the threshold of the lower-level discriminator have their leading-and trailing-edge times digitized. On the other hand, if at any time during the pulse, the amplitude thereof exceeds the threshold of the upper-level discriminator, that event is recorded with the trailing-edge time information, and the pulse so exceeding the upper-level-discriminator threshold will be discarded.

The filtering capability of the discriminators is extremely important in the operation of our velocimeter. Output pulses that are too large, such as those caused by raindrops or by large dirt particles, yield inaccurate results because those pulses saturate the sensors. Moreover, in the case of a large raindrop, there might be serious inaccuracy because the dimensions of the raindrop would be comparable to the dimensions of the light sheets. By virtue of the operation of the upper-level discriminator, any pulses produced by raindrops or other large particles would be discarded and not taken into the information processing.

Perhaps even more important than the discrimination according to particle size is another type of discrimination according to count rates of particles. Although the velocimeter must be capable of supplying output at a high data rate, the information processor will have an upper limit on the rate at which particle data can be processed. Accordingly, we provide a way in which saturation of the data-processing circuits by too much information can be prevented. The aforementioned lower-level discriminator serves that purpose. This can be done by setting the threshold at which the lower-level discriminator discards pulses coming to it.

If the detector modules of the receivers are producing pulses at an extremely high rate, the population of the aerosol particles of all sizes intercepting the light sheets is also at a high level. Thus, by definition, a sufficient number of acceptable-size particles is available. To lower the count rate of particles to an acceptable level, the threshold discrimination level of the lower-level discriminator can be raised. On the other hand, if the particle-count rate provided by the detector modules of the receivers is too low to produce a satisfactory data rate, the threshold level of the lower-level discriminator can be lowered. If it should become necessary to lower sharply the pulse-count rate, the threshold level of the upper-level discriminator can also be adjusted.

The second principal purpose of the circuitry of FIG. 6 is pulses produced by the detector modules, which are to convert the pulses produced by the detector modules, which are analog in form, to digital data characterizing the particles intercepting the light sheets. The digital data required by the information processor must characterize the time of arrival of each aerosol particle at each light sheet. This is accomplished by measurement of the leading and trailing edges of each pulse as shown in FIG. 6, and by taking the time halfway between the leading and trailing edges as the time of the center of the pulse. The time of the pulse center then goes to the delay circuitry, which calculates the time that should elapse between the first particle event and the formation of the first successor light sheet, and the time which should elapse between the formation of the first successor light sheet and the formation of the second successor light sheet. This is accomplished by controlling a high-speed digital clock in accordance with the leading and trailing edges of the pulses illustrated in FIG. 6. By measuring both leading- and trailing-edge times, the effects of relative amplitude changes can be minimized. For each aerosol particle that intercepts a light sheet and produces a scintillation detected by one of the detector modules, the leading- and trailing-edge times of the event pulse are digitized, formatted into a pulse description, and transmitted to the information processor for correlation over a serial data bus if the pulse amplitude as indicated by the detectors is within the passband of the discriminators.

The outputs of the circuitry of FIG. 6 go to an information processor, which is not illustrated because it can comprise commercially available components. We prefer to use three 80286 CPU cards for the data-processing function. We also have chosen commercially available cards to perform the memory, interface, and bus functions respectively.

Earlier in the specification, reference was made to the delay in the formation of the second successor light sheet a predetermined time after the formation of the first successor light sheet, based upon an estimate of the velocity of the aircraft. This estimate is made by means of an algorithm which works in conjunction with the aforementioned upper-level and lower-level discriminators. For the pulse period of the last-calculated velocity vector of the aircraft, the algorithm calculates an expected time of arrival of the aerosol particle at the second successor light sheet after its interception of the first successor light sheet. The algorithm also calculates an "early gate" and a "late gate". These times correspond to the earliest and the latest possible times when the expected particle could arrive at the second successor light sheet after intercepting the first successor light sheet. The early gate and the late gate are spaced widely enough apart so that any maximum possible change in the velocity of the aircraft since the last calculation of its velocity would not prevent the second successor light sheet from being energized when the particle reaches the location of the second successor light sheet. A similar algorithm is employed to calculate the time when the first successor light sheet should be formed after the aerosol particle intercepts the precursor light sheet.

Earlier in the specification, it was explained that the disposition in space of the precursor light sheet and the first and second successor light sheets is intended to be such that the planes of all three sheets are parallel. The computation of airspeed depends on the time of flight of the aerosol particle between the interceptions of the first successor light sheet and the second successor light sheet. However, it was also noted that the flight of an aerosol particle between those light sheets is not likely to be perpendicular to the planes of the respective sheets. Therefore, we have necessarily provided a way to resolve the time of flight between the successor light sheets to determine what the time of flight would have been if the course of the aerosol particle between the light sheets had in fact been perpendicular to the planes of those light sheets. This is accomplished by providing two additional pairs of successor light sheets, each with its own precursor light sheet, and by arranging the three pairs of light sheets in such a way that they are neither parallel nor perpendicular to one another. Assuming that the aerosol particle passes through all three pairs of light sheets and that the time of transit between light sheets of each pair is measured, a transformation of coordinates permits us to compute what the time of transit would have been if it were perpendicular to a pair of light sheets. This computation depends upon knowing with high accuracy the orientation of the second and third pairs of light sheets with respect to the first pair of light sheets. The way in which this is done is illustrated in FIG. 7 of the drawings. In FIG. 7, light sheets 71 and 73 are parallel to each other and thus constitute a light-sheet pair. Likewise, light sheets 75 and 77 are parallel to each other and constitute a second pair of light sheets which, however, is not parallel to light sheets 71 and 73. Finally, light sheets 79 and 81 are parallel to each other and constitute the third light-sheet pair, once again not parallel (or perpendicular) to either the first or the second pair of light sheets.

The information processor which has been mentioned several times in the specification can resolve the time of flight of an aerosol particle in passing between the light sheets of each light-sheet pair into components that would represent the time of flight between the light sheets if the flight were perpendicular thereto. However, a further transformation is necessary in order to convert the resolved data into new data relative to the coordinate system of the aircraft, as distinguished from the coordinate system of each of the pairs of light sheets. This is done by defining unit vectors of velocity and by writing a matrix of three equations expressing the three components of the aircraft's vector velocity in terms of the velocities with respect to the coordinate systems of the respective pairs of light sheets. Having thus determined the vector velocity of the aircraft with respect to its own coordinate system, the angle of attack (Alpha) and the angle of sideslip (Beta) can be calculated. This calculation is symbolized in FIG. 8 of the drawings. And thus the objects of our invention have been fulfilled.

Now that our invention has been fully described in the foregoing specification, the reader is in a position to understand the significance and the technical "elegance" of our invention. In princple, it would be possible to construct a velocimeter having three pairs of light sheets, each of such sheets being formed by optical radiation from a laser operated in the continuous-wave mode. The time of transit of an aerosol particle between the sheets of each pair would be measured, and resolved into components which could undergo a change of coordinates in order to derive the velocity with respect to the coordinate system of the aircraft in which the velocimeter is mounted. Theoretically, by making the light sheets have large dimensions of height and width, one could derive information at a data rate which would be sufficient to compute true air speed and also the angle of attack and angle of sideslip, even when those angles are large. By separating the light sheets by a sufficient difference, the accuracy of measurement would theoretically be satisfactory. The use of light sheets of large dimensions would theoretically make it possible to measure angles of attack (Alpha) as large as any of which the aircraft is capable.

Despite the theoretical possibility of operating a velocimeter with two light sheets formed by radiation from a laser operated in the continuous-wave mode, it is unfortunate that the output power of presently available lasers is not sufficient to form such light sheets at a distance from the skin of the aircraft sufficient to avoid the boundary effects of the shock wave. Only when the laser is operated in the pulsed mode is it possible to obtain enough output radiance to form light sheets having sufficient dimensions that their spacing apart can be great enough to allow accuracy of measurement of velocity. Our solution to the problem has been to provide a precursor light sheet which can be operated in the continuous-wave mode and which provides the "announcement" of the approach of an aerosol particle so that the first successor light sheet can be energized just in time to receive the aerosol particle and so that the second successor light sheet can in turn be energized in sufficient time to be intercepted in its turn by the aerosol particle. The peak power of the successor light sheets, operated in the the pulsed mode, is now sufficient to allow the dimensions of the light sheets and the separation thereof to be sufficient for accuracy of measurement and for measurement of considerable angles of attack and of sideslip.

Having provided a precursor light sheet, we have now been able to limit the dimensions of the precursor light sheet so that it is much smaller in height and width than the successor light sheets. Thus, the aerosol particles which intercept the precursor light sheet are also certain to intercept the successor light sheets despite high angles of attack and of sideslip. The only function of the precursor light sheet is to "announce" the presence of the aerosol particle.

Along with its small dimensions, the precursor light sheet can be positioned without strict requirements of positional accuracy. Although the positioning of the successor light sheets must be very precise, the positioning of the precursor light sheet is not so critical. Still further, the irradiance in the focal plane of all the light sheets is nearly the same by virtue of the fact that the small precursor light sheet is operated in the continuous-wave mode, whereas the larger successor light sheets are operated in the pulsed mode. Thus, the dimensioning and the type of excitation of the precursor light sheet are principal unobvious features of our invention.

This specification has described a favored embodiment of our invention, with special emphasis on those parts of the embodiment which are unique. The specification has referred to certain electronic components and sub-assemblies which we have found to be suitable in the performance of the invention. Many of those components are now commercially available and have been proved satisfactory. However, it will be understood that other types of components may become available in the future and will be capable of fulfilling the functions of the components and sub-assemblies which we have given as examples in this specification. Accordingly, those skilled in the art may wish to make certain changes in the exemplary embodiment, which can be done without departing from the scope of our invention. Therefore, the scope of our invention is set forth and defined in the appended claims, which are to be read in conjunction with the foregoing specification.

We claim:

1. An optical velocimeter for measuring relative velocity between a mobile platform and certain aerosol particles in a gas surrounding said platform, said velocimeter comprising:
   (a) a source of a beam of continuous optical radiation, said source being mounted on said mobile platform;
   (b) means for directing said beam of continuous optical radiation outwardly from said platform into said gas;
   (c) means for forming said beam into a precursor sheet of light in the vicinity of said aerosol particles;
   (d) means mounted on said mobile platform for detecting radiation scattered when an aerosol particle intercepts a sheet of light, including but not limited to said precursor sheet of light;
   (e) a first source of pulsed optical radiation, actuable by said detecting means, and also mounted on said mobile platform;
   (f) means for directing said pulsed optical radiation outwardly from said platform into said gas and forming it into a first successor sheet of light in said gas in close proximity to said precursor sheet of light and displaced therefrom in the direction of relative motion of said particle with respect to said platform whereby said particle can intercept said first successor sheet of light;
   (g) means for subsequently forming a second successor sheet of light in said gas in proximity to the relative position that had been occupied by said first successor sheet of light and displaced therefrom in the direction of relative motion of said particle with respect to said platform, whereby said particle can also intercept said second successor sheet of light;
   (h) means for timing the formation of said first successor sheet of light with reference to the time of interception of said precursor sheet of light by said particle;
   (i) means for timing the formation of said second successor sheet of light with reference to the time of interception of said first successor sheet of light by said particle; and
   (j) means for measuring the time interval between the respective interceptions of said first and second successor sheets of light by said particle.

2. An optical velocimeter in accordance with claim 1, further including at least one additional source of a beam of continuous optical radiation, at least one additional source of pulsed optical radiation, and at least one additional means for detecting radiation scattered when an aerosol particle intercepts a sheet of light, said additional sources of optical radiation and said additional detecting means being oriented on said mobile platform in a non-orthogonal relationship with said first-mentioned respective sources and detecting means so as to form respective sheets of light which are not coincident with or parallel to the first-mentioned sheets of light.

3. An optical velocimeter in accordance with claim 2 in which said additional sources and detecting means are oriented so as to produce pairs of sheets of light that can be successively intercepted by said particle after intercepting said first-mentioned sheets of light.

4. An optical velocimeter in accordance with claim 3 further including computing means for operating upon the respective distance-time intervals for passage of said particle through first, second and third pairs of successor sheets of light, resolving said intervals into components normal and parallel to said respective sheets of light, and combining said resolved components to arrive at the true relative velocity between said platform and said particle.

5. An optical velocimeter in accordance with claim 1 in which said source of a beam of continuous optical radiation is a laser diode operated in the continuous-wave mode, and in which said sources of pulsed optical radiation are laser diodes operated in the pulsed mode.

6. An optical velocimeter in accordance with claim 1 in which said mobile platform is an aircraft.

7. An optical velocimeter in accordance with claim 4 in which said mobile platform is an aircraft and in which said computing means computes true air speed of said aircraft, as well as angle of attack and angle of sideslip based upon said resolved components of distance-time intervals for passage of an aerosol particle between sheets of each pair of sheets of light.

8. An optical velocimeter in accordance with claim 1 in which said means for subsequently forming a second successor sheet of light employs said first source of pulsed optical radiation by rotating the polarization of the radiation output of said first source, said means further including an optical differential-refraction device sensitive to relative polarization for causing said second successor sheet of light to be displaced in space from the former relative position of said first successor sheet of light.

* * * * *